(12) United States Patent
Potpallewar

(10) Patent No.: US 9,250,692 B2
(45) Date of Patent: Feb. 2, 2016

(54) POWER-EFFICIENT PERSONALIZATION OF A COMPUTING ENVIRONMENT OF A DATA PROCESSING DEVICE WITH RESPECT TO A USER THEREOF

(71) Applicant: NVIDIA Corporation, Santa Clara, CA (US)

(72) Inventor: Vivek Potpallewar, Maharashtra (IN)

(73) Assignee: NVIDIA Corporation, Santa Clara, CA (US)

(*) Notice: Subject to any disclaimer, the term of this patent is extended or adjusted under 35 U.S.C. 154(b) by 134 days.

(21) Appl. No.: 14/022,255

(22) Filed: Sep. 10, 2013

(65) Prior Publication Data

US 2015/0070366 A1     Mar. 12, 2015

(51) Int. Cl.
*G06F 13/14* (2006.01)
*G06T 1/00* (2006.01)
*G06F 15/00* (2006.01)
*G06F 1/32* (2006.01)
*G09G 5/10* (2006.01)

(52) U.S. Cl.
CPC ................ *G06F 1/3265* (2013.01); *G09G 5/10* (2013.01)

(58) Field of Classification Search
None
See application file for complete search history.

(56) References Cited

U.S. PATENT DOCUMENTS

| | | | |
|---|---|---|---|
| 6,188,380 B1 | 2/2001 | Kawashima et al. | |
| 6,337,675 B1 | 1/2002 | Toffolo et al. | |
| 6,762,741 B2 | 7/2004 | Weindorf | |
| 7,751,475 B1 | 7/2010 | Crandall et al. | |
| 7,952,555 B2 | 5/2011 | Sakai | |
| 8,390,648 B2 | 3/2013 | Ptucha et al. | |
| 8,400,626 B2 | 3/2013 | Mahowald | |
| 8,890,876 B1* | 11/2014 | Glaskowsky | 345/519 |
| 2009/0278828 A1 | 11/2009 | Fletcher et al. | |
| 2010/0117579 A1* | 5/2010 | Culbert et al. | 318/471 |
| 2010/0321396 A1 | 12/2010 | Xu | |
| 2012/0050307 A1* | 3/2012 | Mahowald et al. | 345/590 |
| 2013/0328890 A1* | 12/2013 | Avkarogullari et al. | 345/501 |

FOREIGN PATENT DOCUMENTS

EP     1793597 A1     6/2007

OTHER PUBLICATIONS

EE Times, "Ambient light sensors adjust LCD brightness to save battery power," Dec. 26, 2006, retrieved from http://www.eetimes.com/document.asp?doc_id=1302779.

* cited by examiner

*Primary Examiner* — Jacinta M Crawford
(74) *Attorney, Agent, or Firm* — Zilka-Kotab, PC

(57) ABSTRACT

A method includes providing, in a data processing device including a Central Processing Unit (CPU) and a Graphics Processing Unit (GPU), a capability to interface a microprocessor with the GPU, and communicatively interfacing a sensor with the microprocessor. The method also includes obtaining data related to an operating environment external to the data processing device through the sensor, and determining, through the microprocessor, personalization required of a computing environment of the data processing device with respect to a user thereof based on the data related to the operating environment external to the data processing device. Further, the method includes utilizing the GPU solely to effect the personalization required of the computing environment of the data processing device with respect to the user determined through the microprocessor to reduce power consumption through the data processing device.

20 Claims, 7 Drawing Sheets

POWER-EFFICIENT PERSONALIZATION OF A COMPUTING ENVIRONMENT OF A DATA PROCESSING DEVICE WITH RESPECT TO A USER THEREOF

FIELD OF TECHNOLOGY

This disclosure relates generally to data processing devices and, more particularly, to power-efficient personalization of a computing environment of a data processing device with respect to a user thereof.

BACKGROUND

A data processing device (e.g., a personal computer, a laptop computer, a notebook, a netbook, an ultrabook, a mobile device such as a mobile phone) may be operating in an environment non-conducive (e.g., low ambient light) to a user thereof. The user may have to manually intervene on the data processing device to control one or more parameter(s) of a computing environment and/or one or more component(s) thereof to account for the non-conduciveness. The aforementioned requirement of manual intervention on part of the user may frustrate the user.

SUMMARY

Disclosed are a method, a device and/or a system of power-efficient personalization of a computing environment of a data processing device with respect to a user thereof.

In one aspect, a method includes providing, in a data processing device including a Central Processing Unit (CPU) and a Graphics Processing Unit (GPU), a capability to interface a microprocessor with the GPU, and communicatively interfacing a sensor with the microprocessor. The method also includes obtaining data related to an operating environment external to the data processing device through the sensor, and determining, through the microprocessor, personalization required of a computing environment of the data processing device with respect to a user thereof based on the data related to the operating environment external to the data processing device. Further, the method includes utilizing the GPU solely to effect the personalization required of the computing environment of the data processing device with respect to the user determined through the microprocessor to reduce power consumption through the data processing device.

In another aspect, a non-transitory medium, readable through a data processing device including a CPU and a GPU and including instructions embodied therein that are executable through the data processing device, is disclosed. The non-transitory medium includes instructions to provide, in the data processing device, a capability to interface a microprocessor with the GPU, and instructions to communicatively interface a sensor with the microprocessor. The non-transitory medium also includes instructions to obtain data related to an operating environment external to the data processing device through the sensor, and instructions to determine, through the microprocessor, personalization required of a computing environment of the data processing device with respect to a user thereof based on the data related to the operating environment external to the data processing device. Further, the non-transitory medium includes instructions to utilize the GPU solely to effect the personalization required of the computing environment of the data processing device with respect to the user determined through the microprocessor to reduce power consumption through the data processing device.

In yet another aspect, a data processing device includes a CPU, a GPU, a sensor configured to obtain data related to an operating environment external to the data processing device, and a microprocessor communicatively interfaced with the GPU and the sensor. The microprocessor is configured to determine personalization required of a computing environment of the data processing device with respect to a user thereof based on the data related to the operating environment external to the data processing device obtained through the sensor. The GPU is configured to be utilized solely to effect the personalization required of the computing environment of the data processing device with respect to the user determined through the microprocessor to reduce power consumption through the data processing device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of power-efficient personalization of a computing environment of a data processing device with respect to a user thereof. Although the present embodiments have been described with reference to specific example embodiments, it will be evident that various modifications and changes may be made to these embodiments without departing from the broader spirit and scope of the various embodiments.

Figure 1:
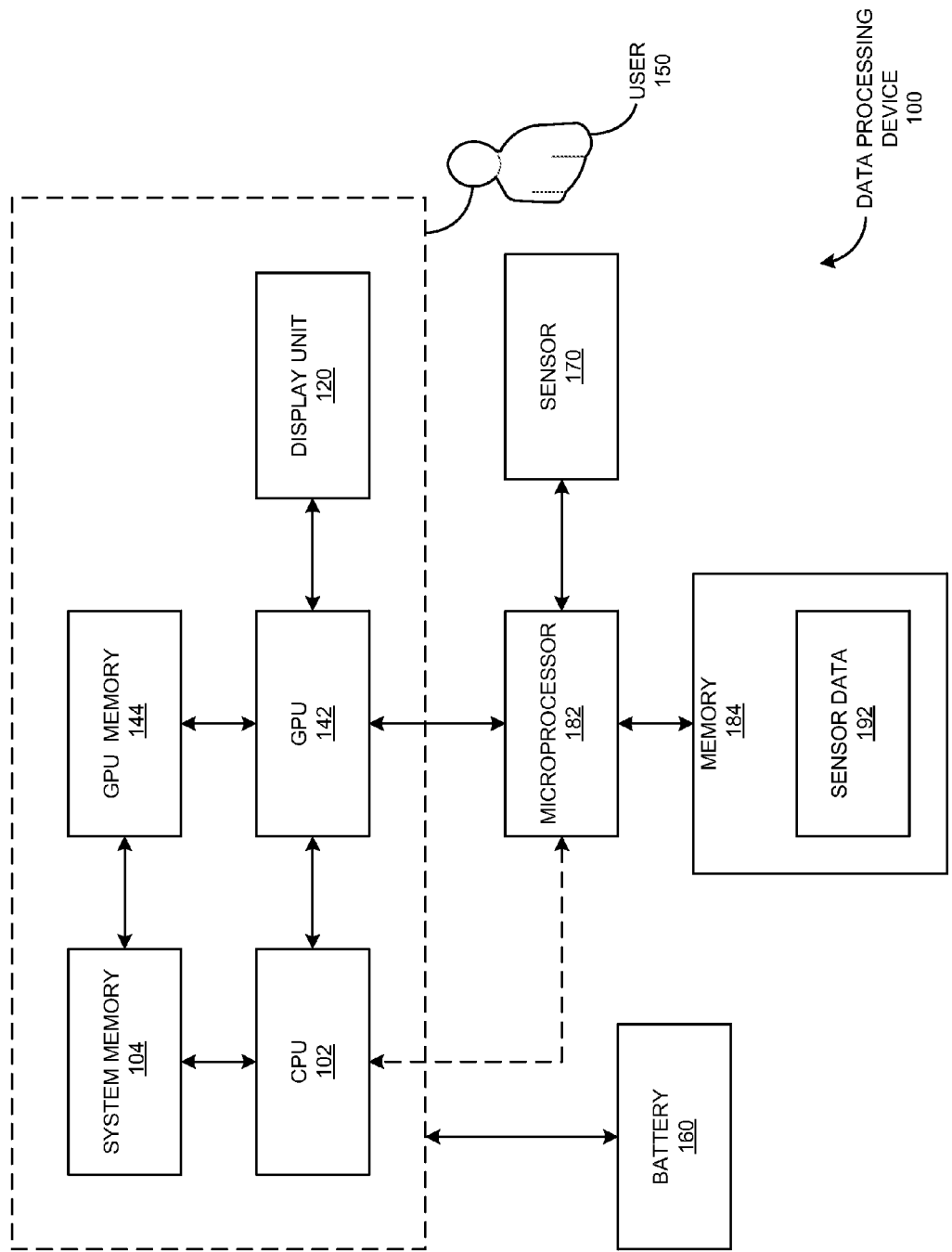
FIG. 1 is a schematic view of a data processing device, according to one or more embodiments.

FIG. 1 shows a data processing device 100, according to one or more embodiments. An example data processing device 100 may include but is not limited to a desktop computer, a laptop computer, a notebook computer, a netbook, an ultrabook, a tablet and a mobile device such as a mobile phone. In one or more embodiments, data processing device 100 may include a Central Processing Unit (CPU) 102 communicatively coupled to a system memory 104; CPU 102 may be configured to address storage locations in system memory 104. In one or more embodiments, system memory 104 may include a volatile memory (e.g., Random Access Memory (RAM)) and/or a non-volatile memory (e.g., Read-Only Memory (ROM), hard disk).

Similarly, in one or more embodiments, data processing device 100 may include a Graphics Processing Unit (GPU) 142 communicatively coupled to a GPU memory 144 associated therewith; again, GPU 142 may be configured to address storage locations in GPU memory 144, and GPU memory 144 may include a volatile memory and/or a non-volatile memory. GPUs are well known to one skilled in the art; therefore, detailed discussion associated therewith has been skipped for the sake of brevity and clarity. In one or more embodiments, data processing device 100 may include a display unit 120 (e.g., a Cathode Ray Tube (CRT), a Liquid Crystal Display (LCD), a Light Emitting Diode (LED) display) to have display data processed through GPU 142 (or, CPU 102, if required) rendered thereon. FIG. 1 shows display unit 120 as being interfaced with GPU 142.

Figure 2:
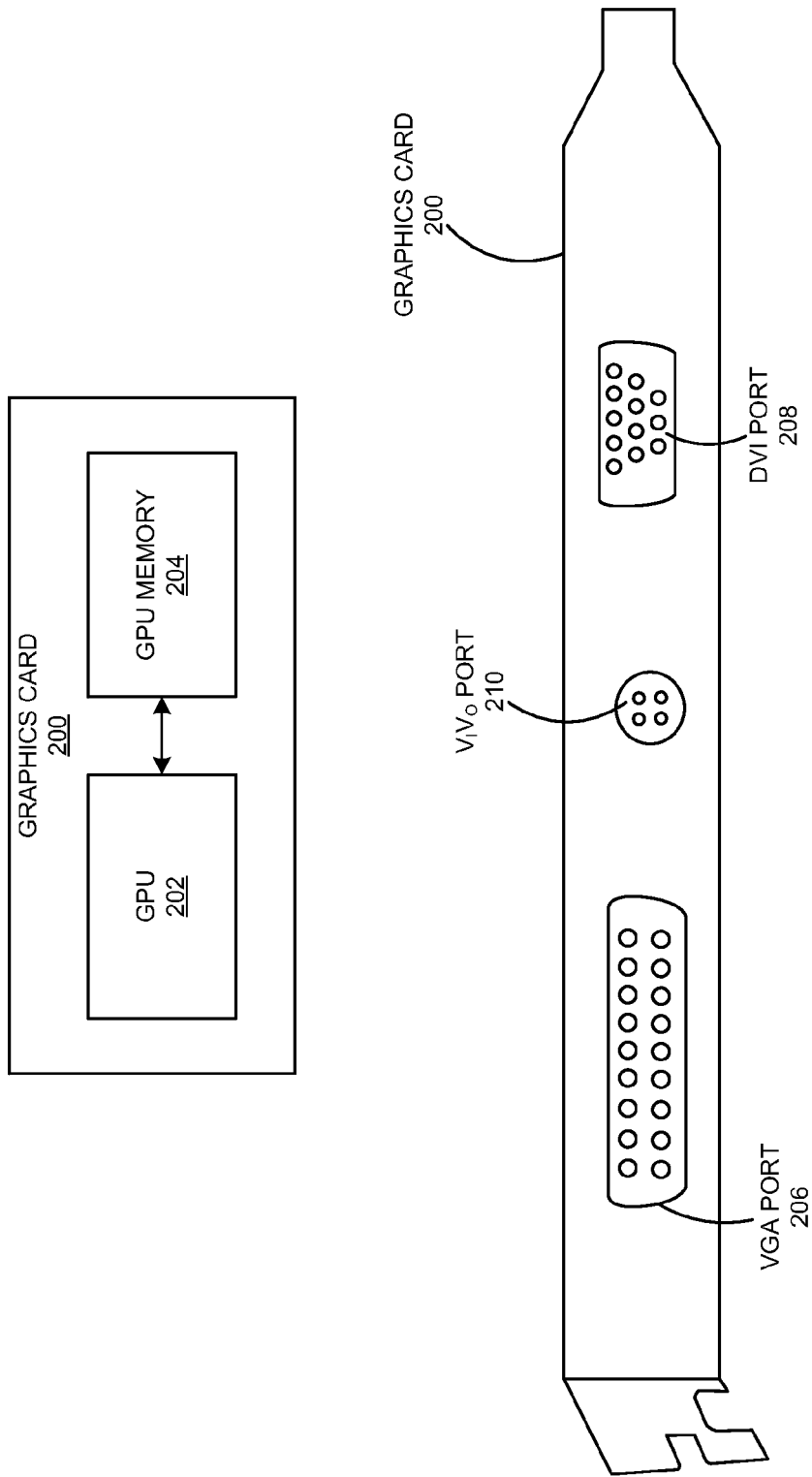
FIG. 2 is a schematic and an illustrative view of a graphics card including a Graphics Processing Unit (GPU) in a typical implementation thereof.

FIG. 2 shows a graphics card 200 including a GPU 202 (analogous to GPU 142) in a typical implementation thereof. Graphics card 200 may also include a GPU memory 204 (analogous to GPU memory 144) to store data for processing through GPU 202. FIG. 2 also shows a front view of graphics card 200 including a Video Graphics Array (VGA) port 206 and a Digital Visual Interface (DVI) port 208. The aforementioned ports may enable coupling of a display unit (e.g., display unit 120) thereto configured to have an output of video/graphics processing through GPU 202 rendered thereon. In addition, graphics card 200 may include a Video In/Video Out (ViVo) port 210 to enable coupling of devices such as a video recorder, camera and a television thereto. It should be noted that VGA port 206, DVI port 208 and ViVo port 210 are merely shown for example purposes; other video ports may also be available on graphics card 200 either in addition to the aforementioned ports or instead of one or more of the aforementioned ports.

During video processing through data processing device 100, CPU 102 may enable loading of data onto GPU memory 204 and/or instruct GPU 202 appropriately such that GPU 202 utilizes system memory 104 and/or GPU memory 204 to process said data for rendering thereof on the display unit discussed above. Thus, GPU 202 may serve as a dedicated graphics/video processing engine.

Figure 3:
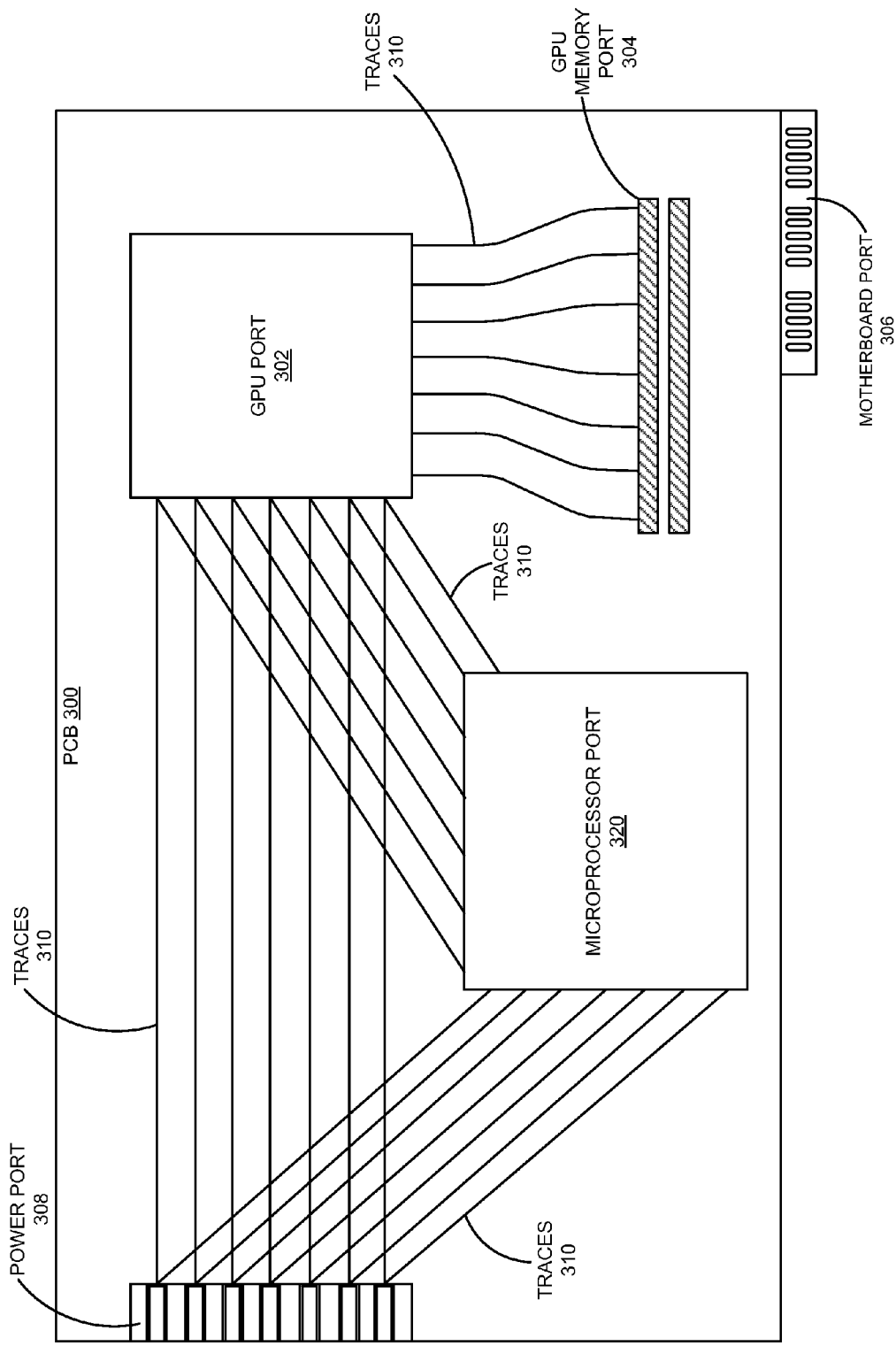
FIG. 3 is a schematic and an illustrative view of a Printed Circuit Board (PCB) of a graphics card, according to one or more embodiments.

FIG. 3 shows a Printed Circuit Board (PCB) 300 of a graphics card (e.g., graphics card 200, another analogous graphics card) according to one or more embodiments. In one or more embodiments, PCB 300 may include components critical to the functioning of the graphics card arranged thereon; in other words, PCB 300 may be the core assembly unit of the graphics card. In one or more embodiments, PCB 300 may be configured to receive GPU 142 and GPU memory 144 in a GPU port 302 (e.g., a socket) and a GPU memory port 304 (e.g., another socket) thereof respectively. Other components of PCB 300 such as GPU heat sink, GPU fan et al. have been skipped for the sake of illustrative convenience and clarity. FIG. 3 also shows a motherboard port 306 configured to enable coupling of the graphics card to a port (e.g., expansion slot) on a motherboard (not shown) of data processing device 100.

Further, FIG. 3 shows a power port 308 on PCB 300; the graphics card may be configured to derive power from a battery of data processing device 100; the coupling of the graphics card to the motherboard of data processing device 100 through motherboard port 306 may power the graphics card (or, GPU 142). Alternately, the graphics card (or, GPU 142) may be powered through an internal battery (not shown) thereof. To generalize, power port 308 may be associated with the powering of GPU 142 through the battery of data processing device 100 or an internal battery of the graphics card. It is obvious that data processing device 100 may also derive power through a power supply unit (not shown) directly interfaced with an Alternating Current (AC) mains. Here, power port 308 may be associated with the powering of GPU 142 through the interfacing of data processing device 100 with the power supply unit.

Referring back to FIG. 1, data processing device 100 may include a battery 160 associated therewith. Although, battery 160 is shown interfaced with data processing device 100, it should be noted that battery 160 may also be regarded as part of data processing device 100. In one or more embodiments, as shown in FIG. 3, GPU port 302 and GPU memory port 304 may have traces 310 therebetween across a surface of PCB 300; the aforementioned traces 310 may provide conductive pathway(s) between circuit(s) associated with GPU 142 and GPU memory 144. Further, in one or more embodiments, traces 310 may extend between GPU port 302 and power port 308.

In addition, in one or more embodiments, PCB 300 may include a port (e.g., microprocessor port 320) for a low-end microprocessor core. For the aforementioned purpose, in one or more embodiments, traces 310 may be extended between GPU port 302 and microprocessor port 320. Additionally (or, optionally), traces 310 may also directly extend between power port 308 and microprocessor port 320. Therefore, in one or more embodiments, the low-end microprocessor core may be indirectly powered through the powering of GPU 142 through power port 308 or directly powered through power port 308. Thus, in one or more embodiments, traces 310 on PCB 300 may be extended beyond the normal use of the graphics card. The modification of PCB 300 may be performed on an existing graphics card; alternately, a new graphics card may be appropriately designed.

It should be noted that traces 310 are shown to merely illustrate the concepts associated with the exemplary embodiments; in other words, traces 310 of FIG. 3 are merely schematics. Further, other traces associated with components irrelevant to the concepts discussed herein have been omitted for the sake of clarity and brevity.

FIG. 1 shows an example low-end microprocessor core, viz. microprocessor 182 being interfaced with GPU 142. It should be noted that microprocessor 182 may not be on PCB 300 with GPU 142. For example, microprocessor 182 may be external (e.g., associated with a sensor (to be discussed below), external to both the sensor and data processing device 100) to data processing device 100. Therefore, traces 310 may lead to a port (not shown) on PCB 300, and an appropriate adapter may be utilized to interface GPU 142 with microprocessor 182 through the port. Alternately, the extension of traces 310 may not be required at all. For example, an output port of GPU 142 may be directly interfaced with microprocessor 182, again, by way of an adapter.

In one or more embodiments, the interfacing of GPU 142 with microprocessor 182 may enable microprocessor 182 to be utilized for performing operations associated with determining a requisite personalization of a computing environment of a user 150 of data processing device 100. FIG. 1 shows a sensor 170 communicatively coupled to microprocessor 182 instead of CPU 102 or GPU 142, according to one or more embodiments. In one or more embodiments, sensor 170 may be configured to obtain data associated with an external operating environment (e.g., ambient brightness level, image data, video data). In one or more embodiments, the sensor data (e.g., sensor data 192 shown as being stored in a memory 184 associated with microprocessor 182) may be analyzed through microprocessor 182 to determine the personalization of the computing environment required on data processing device 100 with respect to user 150.

In one or more embodiments, once the personalization is determined, microprocessor 182 may transmit a control signal to GPU 142, which, in turn, transmits an appropriate control signal to effect the personalization. Examples of sensor 170 may include, but are not limited to, an ambient light sensor, an antenna and an image sensor such as a video/digital camera.

Figure 4:
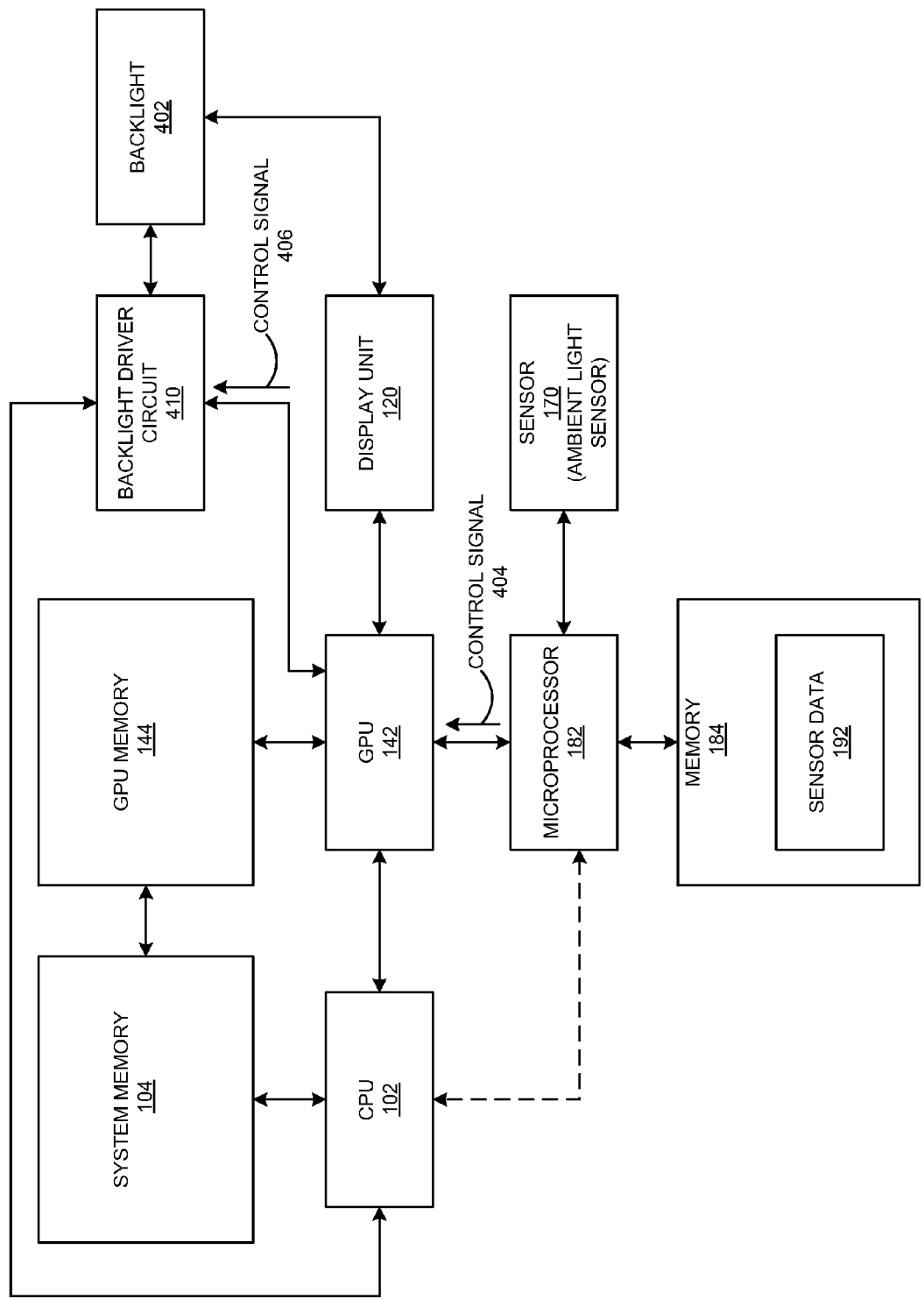
FIG. 4 is a schematic view of an example implementation of the data processing device of FIG. 1 in which a sensor thereof is an ambient light sensor.

FIG. 4 shows an example implementation in which sensor 170 is an ambient light sensor. Here, sensor 170 may be configured to sense data (e.g., sensor data 192) related to ambient light with respect to data processing device 100. Sensor data 192 may then be transmitted for processing through microprocessor 182. Based on the processing, microprocessor 182 may determine an appropriate level to which an intensity of a backlight 402 of display unit 120 is to be controlled. For example, the intensity level of backlight 402 may be reduced if the ambient light intensity is determined to be lower than a threshold; the intensity level may be increased if the ambient light intensity is determined to be higher than the threshold.

Upon the determination, microprocessor 182 may be configured to transmit a control signal 404 to GPU 142, based on which GPU 142, in turn, may transmit another control signal 406 to a backlight driver circuit 410 of backlight 402. Based on control signal 406, backlight driver circuit 410 may be configured to have an output thereof modified such that the intensity level of backlight 402 is controlled to the appropriate level.

Figure 5:
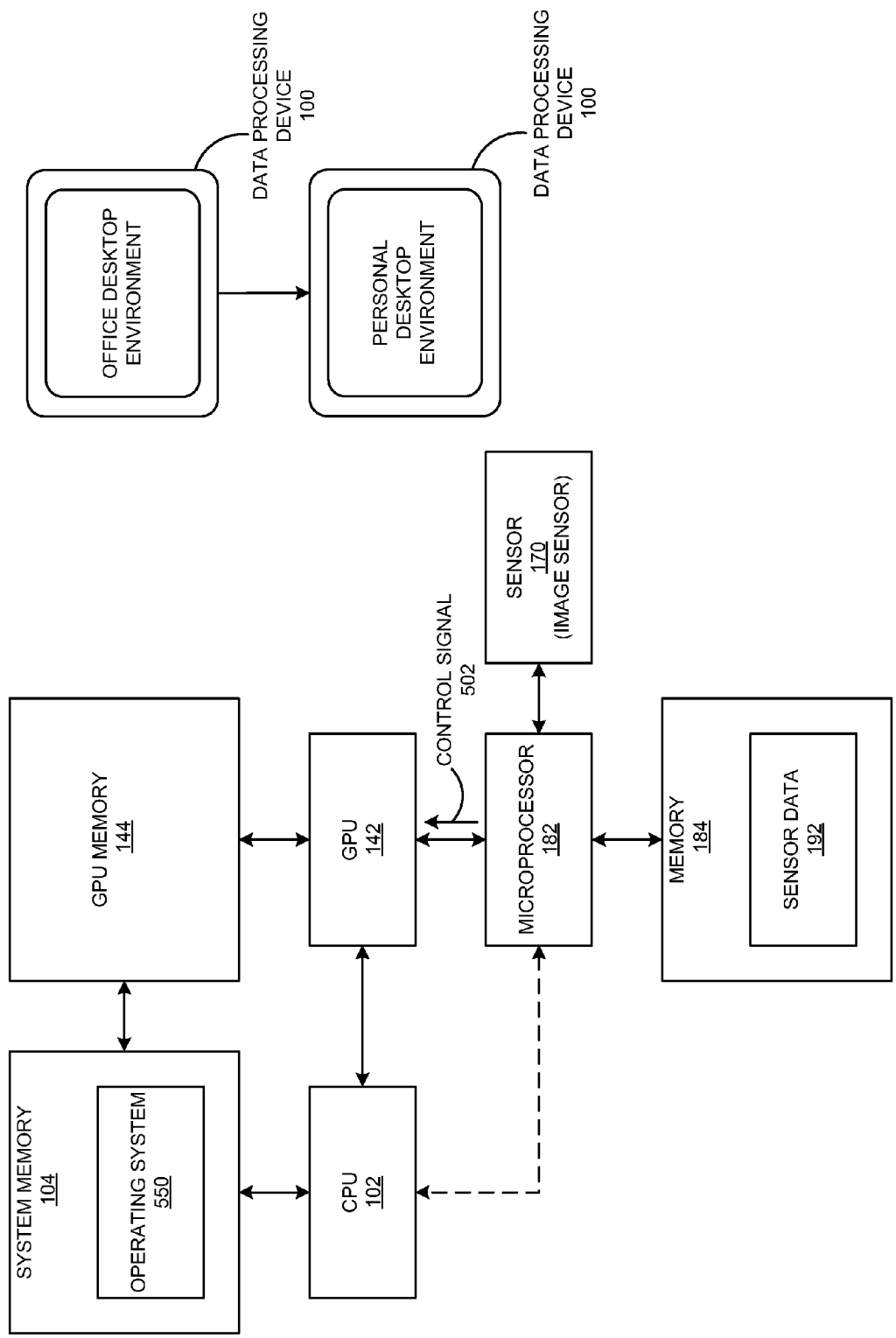
FIG. 5 is a schematic view of an example implementation of the data processing device of FIG. 1 in which the sensor thereof is an image sensor.

FIG. 5 shows another example implementation in which sensor 170 is an image sensor. Here, sensor 170 may be configured to capture an image of a background environment of data processing device 100. For example, user 150 may be at a workplace thereof; sensor 170 may be configured to capture an image (example sensor data 192) of an office wall. Based on a reference image stored in memory 184, microprocessor 182 may be configured to determine that user 150 is at the workplace and transmit an appropriate control signal 502 to GPU 142. GPU 142, in turn, may interact (e.g., by way of CPU 102) with an operating system 550 (shown as being stored in system memory 104) to modify a current desktop environment of data processing device 100 to an office profile (e.g., stored as an operating system profile). When user 150 returns home, sensor 170 may capture an image related to the home environment, which is determined through microprocessor 182. Microprocessor 182 may then transmit control signal 502 to GPU 142 to effect the modification of the desktop environment back to a personal profile (e.g., also stored as an operating system profile).

Figure 6:
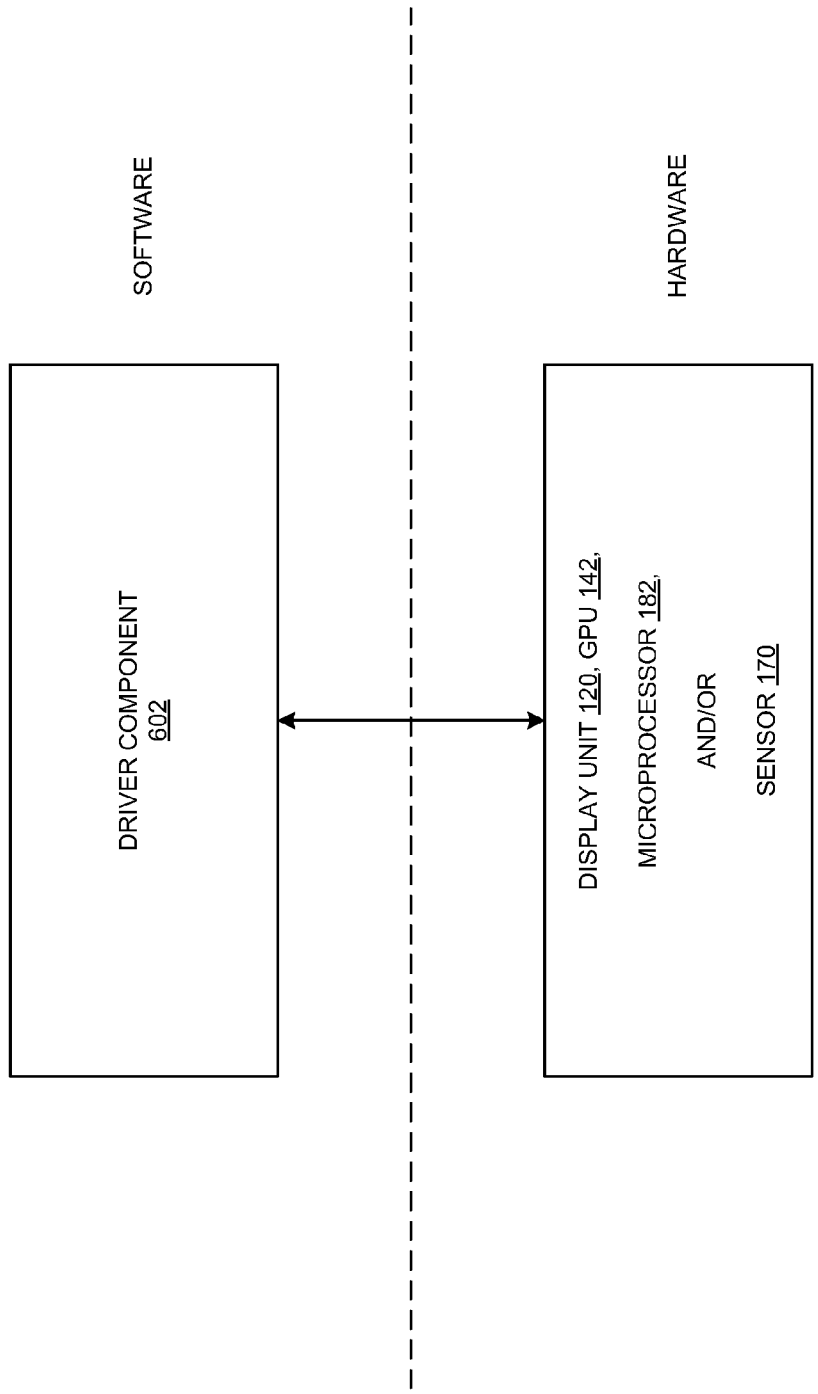
FIG. 6 is a schematic view of interaction between a driver component and a display unit, a GPU, a microprocessor and/or the sensor of the data processing device of FIG. 1, according to one or more embodiments.

It should be noted that other forms of sensing (e.g., sensing data related to distance between data processing device 100 and user 150) and personalization of the computing environment of data processing device 100 based on the sensing are within the scope of the exemplary embodiments discussed herein. Definitions (e.g., intensity levels of backlight 402) to be utilized in the personalization may be made available in a driver component associated with a hardware component of data processing device 100 such as display unit 120, GPU 142, microprocessor 182 and/or sensor 170. In one example embodiment, the loading of the driver component on data processing device 100 may automatically trigger the sensing. Other non-automatic forms of triggering are within the scope of the exemplary embodiments discussed herein. FIG. 6 shows interaction between a driver component 602 and display unit 120, GPU 142, microprocessor 182 and/or sensor 170, according to one or more embodiments.

In one or more embodiments, the graphics card/GPU 142 and display unit 120 may be high power-consuming components of data processing device 100. In one or more embodiments, by performing the determination of the requisite personalization of the computing environment of data processing device 100 with respect to user 150 at microprocessor 182 instead of CPU 102/GPU 142, power consumption of data processing device 100 may be reduced; further, the ability to control the intensity level of backlight 402 may also contribute to the power reduction. The benefits of other forms of personalization such as the ability to personalize desktop environments of user 150 on data processing device 100 are self-evident. Again, other forms of personalization of the computing environment of data processing device 100 with respect to user 150 are within the scope of the exemplary embodiments discussed herein.

In one or more embodiments, as discussed or at least implied above, microprocessor 182 may be configured to share power from GPU 142 to process data (e.g., sensor data 192) from sensor 170. Alternately, in one or more embodiments, microprocessor 102 may directly derive power from battery 160 or a battery associated with the graphics card. In the case of GPU 142 being in an OFF state, microprocessor 182 may be configured to transmit the control signal to CPU 102 instead of GPU 142. Here, some form of electrical interfacing (e.g., by way of extending traces 310, interfaces such as adapters) may also be provided between microprocessor 182 and CPU 102. CPU 102, in turn, may transmit a control signal to backlight driver circuit 410 of backlight 402 of FIG. 4 to control an intensity level thereof. FIG. 4 shows backlight driver circuit 410 being interfaced with both GPU 142 and CPU 102.

To summarize, exemplary embodiments provide for a means to reduce power consumption through data processing device 100 based on executing processing of sensor data 192 through microprocessor 182 instead of CPU 102/GPU 142. GPU 142 (or, CPU 102) may merely be utilized to effect the personalization of the computing environment of data processing device 100 with respect to user 150. Also, it should be noted that several forms of sensing and personalization of the computing environment of data processing device 100 with respect to user 150 may be realized in conjunction with one another.

In addition, instructions associated with driver component 602, the sensing of the external operating environment of data processing device 100 and/or the personalization of the computing environment of data processing device 100 with respect to user 150 may be embodied in a non-transitory medium (e.g., a Compact Disc (CD), a Digital Video Disc (DVD), a Blu-ray Disc®, a hard drive) readable through data processing device 100.

Figure 7:
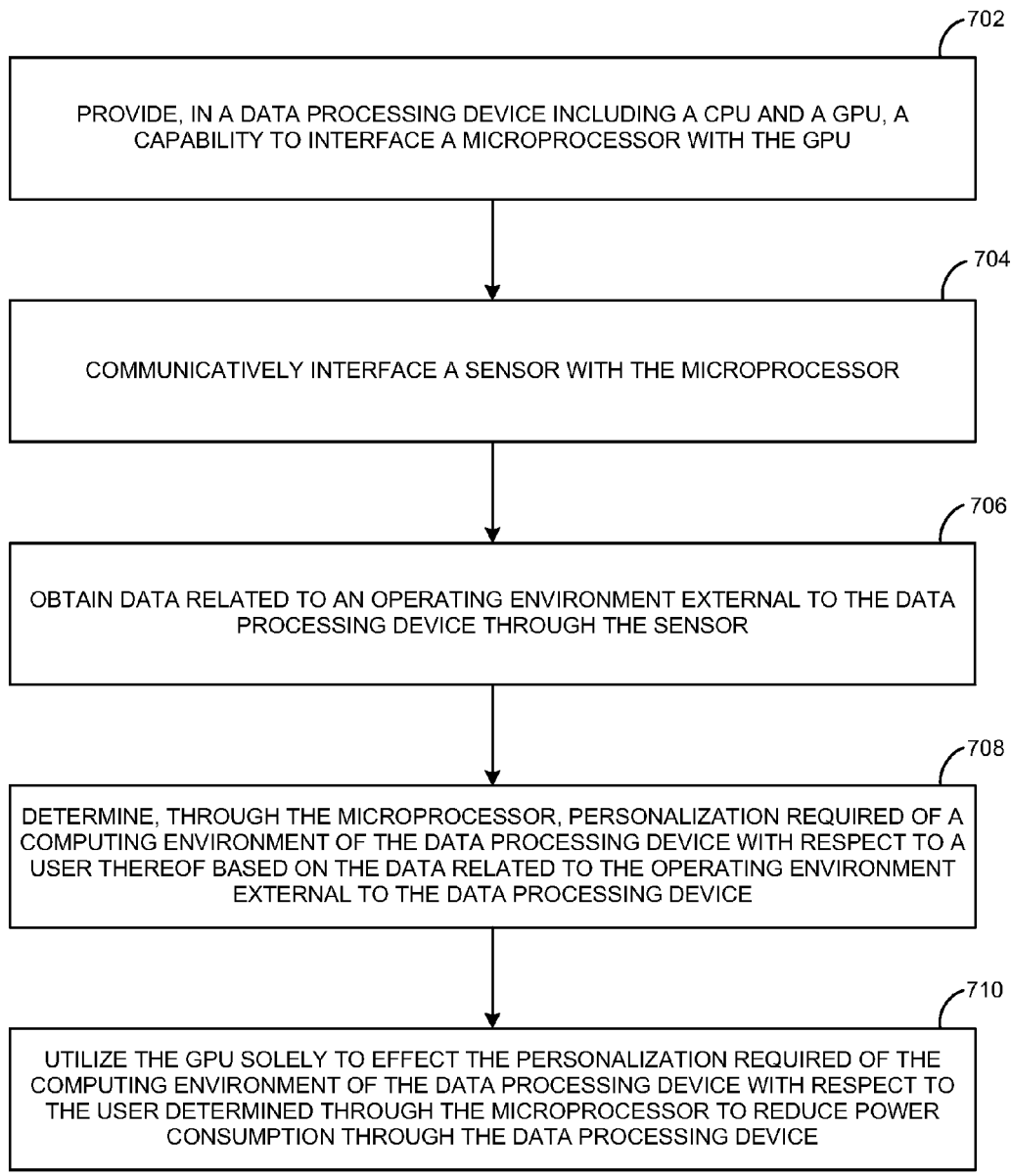
FIG. 7 is a process flow diagram detailing the operations involved in power-efficient personalization of a computing environment of the data processing device of FIG. 1 with respect to a user thereof, according to one or more embodiments.

FIG. 7 shows a process flow diagram detailing the operations involved in power-efficient personalization of a computing environment of data processing device 100 with respect to user 150, according to one or more embodiments.

In one or more embodiments, operation 702 may involve providing, in data processing device 100 including CPU 102 and GPU 142, a capability to interface microprocessor 182 with GPU 142. In one or more embodiments, operation 704 may involve communicatively interfacing sensor 170 with microprocessor 182. In one or more embodiments, operation 706 may involve obtaining data related to an operating environment external to data processing device 100 through sensor 170.

In one or more embodiments, operation 708 may involve determining, through microprocessor 182, personalization required of a computing environment of data processing device 100 with respect to user 150 based on the data related to the operating environment external to data processing device 100. In one or more embodiments, operation 710 may then involve utilizing GPU 142 solely to effect the personalization required of the computing environment of data processing device 100 with respect to user 150 determined through microprocessor 182 to reduce power consumption through data processing device 100.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., a system including data processing device 100), and may be performed in any order (e.g., including using means for achieving the various operations). Accordingly, the specification and drawings are to be regarded in an illustrative rather than a restrictive sense.

What is claimed is:

1. A method comprising:
providing, in a data processing device comprising a Central Processing Unit (CPU) and a Graphics Processing Unit (GPU), a capability to interface a microprocessor with the GPU;
communicatively interfacing a sensor with the microprocessor;
obtaining data related to an operating environment external to the data processing device through the sensor;
determining, through the microprocessor, personalization required of a computing environment of the data processing device with respect to a user thereof based on the data related to the operating environment external to the data processing device; and
utilizing the GPU solely to effect the personalization required of the computing environment of the data processing device with respect to the user determined through the microprocessor to reduce power consumption through the data processing device.

2. The method of claim 1, comprising providing at least one of: an ambient light sensor, an antenna and an image sensor as the sensor communicatively interfaced with the microprocessor.

3. The method of claim 2, wherein when the sensor is an ambient light sensor, the method comprises:
obtaining, through the ambient light sensor, data related to an intensity level of an ambient environment external to the data processing device;
determining, through the microprocessor, an intensity level to which an output of a backlight of a display unit of the data processing device is to be controlled based on the obtained data; and
effecting, through the GPU, a modification of the intensity level of the output of the backlight of the display unit based on the determination through the microprocessor.

4. The method of claim 3, wherein when the GPU is in an OFF state thereof, the method comprises:
deriving power to the microprocessor through one of: a battery of the data processing device, a battery associated with a graphics card comprising the GPU and an Alternating Current (AC) mains; and
effecting, through the CPU, the modification of the intensity level of the output of the backlight of the display unit based on the determination through the microprocessor.

5. The method of claim 1, wherein providing the capability to interface the microprocessor with the GPU further comprises one of:
providing traces between the GPU and the microprocessor across a surface of a Printed Circuit Board (PCB) comprising the GPU, the traces providing conductive pathways between circuits of the GPU and the microprocessor; and
communicatively interfacing the microprocessor with the GPU by way of an adapter.

6. The method of claim 5, further comprising providing traces between the microprocessor and a power port of the PCB, the power port of the PCB being configured to enable powering of the GPU and the microprocessor therethrough.

7. The method of claim 1, further comprising providing definitions to be utilized during the determination of the personalization required of the computing environment in a driver component associated with at least one of the GPU, the microprocessor, the sensor and a display unit of the data processing device.

8. A non-transitory medium, readable through a data processing device comprising a CPU and a GPU and including instructions embodied therein that are executable through the data processing device, comprising:
instructions to provide, in the data processing device, a capability to interface a microprocessor with the GPU;
instructions to communicatively interface a sensor with the microprocessor;
instructions to obtain data related to an operating environment external to the data processing device through the sensor;
instructions to determine, through the microprocessor, personalization required of a computing environment of the data processing device with respect to a user thereof based on the data related to the operating environment external to the data processing device; and
instructions to utilize the GPU solely to effect the personalization required of the computing environment of the data processing device with respect to the user determined through the microprocessor to reduce power consumption through the data processing device.

9. The non-transitory medium of claim 8, comprising instructions compatible with at least one of: an ambient light sensor, an antenna and an image sensor being provided as the sensor communicatively interfaced with the microprocessor.

10. The non-transitory medium of claim 9, wherein when the sensor is an ambient light sensor, the non-transitory medium comprises instructions to:
- obtain, through the ambient light sensor, data related to an intensity level of an ambient environment external to the data processing device;
- determine, through the microprocessor, an intensity level to which an output of a backlight of a display unit of the data processing device is to be controlled based on the obtained data; and
- effect, through the GPU, a modification of the intensity level of the output of the backlight of the display unit based on the determination through the microprocessor.

11. The non-transitory medium of claim 10, wherein when the GPU is in an OFF state thereof, the non-transitory medium comprises instructions to effect, through the CPU, the modification of the intensity level of the output of the backlight of the display unit based on the determination through the microprocessor.

12. The non-transitory medium of 8, wherein instructions to provide the capability to interface the microprocessor with the GPU further comprise one of:
- instructions compatible with traces provided between the GPU and the microprocessor across a surface of a PCB comprising the GPU, the traces providing conductive pathways between circuits of the GPU and the microprocessor; and
- instructions compatible with communicatively interfacing the microprocessor with the GPU by way of an adapter.

13. The non-transitory medium of claim 8, further comprising instructions to provide definitions to be utilized during the determination of the personalization required of the computing environment in a driver component associated with at least one of the GPU, the microprocessor, the sensor and a display unit of the data processing device.

14. A data processing device comprising:
- a CPU;
- a GPU;
- a sensor configured to obtain data related to an operating environment external to the data processing device; and
- a microprocessor communicatively interfaced with the GPU and the sensor, the microprocessor being configured to determine personalization required of a computing environment of the data processing device with respect to a user thereof based on the data related to the operating environment external to the data processing device obtained through the sensor,
- wherein the GPU is configured to be utilized solely to effect the personalization required of the computing environment of the data processing device with respect to the user determined through the microprocessor to reduce power consumption through the data processing device.

15. The data processing device of claim 14, wherein the sensor is at least one of: an ambient light sensor, an antenna and an image sensor.

16. The data processing device of claim 15, wherein when the sensor is an ambient light sensor:
- the ambient light sensor is configured to obtain data related to an intensity level of an ambient environment external to the data processing device,
- the microprocessor is configured to determine an intensity level to which an output of a backlight of a display unit of the data processing device is to be controlled based on the obtained data, and
- the GPU is configured to effect a modification of the intensity level of the output of the backlight of the display unit based on the determination through the microprocessor.

17. The data processing device of claim 16, wherein when the GPU is in an OFF state thereof:
- the microprocessor is configured to derive power through one of: a battery of the data processing device, a battery associated with a graphics card comprising the GPU and an AC mains, and
- the CPU is configured to effect the modification of the intensity level of the output of the backlight of the display unit based on the determination through the microprocessor.

18. The data processing device of claim 14, wherein one of: traces are provided between the GPU and the microprocessor across a surface of a PCB comprising the GPU, the traces providing conductive pathways between circuits of the GPU and the microprocessor, and the microprocessor is communicatively interfaced with the GPU by way of an adapter.

19. The data processing device of claim 18, wherein traces are further provided between the microprocessor and a power port of the PCB, the power port of the PCB being configured to enable powering of the GPU and the microprocessor therethrough.

20. The data processing device of claim 14, further comprising a driver component associated with at least one of the GPU, the microprocessor, the sensor and a display unit of the data processing device, the driver component comprising definitions to be utilized during the determination of the personalization required of the computing environment provided therein.

* * * * *